(12) United States Patent
Yao

(10) Patent No.: US 12,366,888 B2
(45) Date of Patent: Jul. 22, 2025

(54) ELECTRONIC DEVICE

(71) Applicant: VIVO MOBILE COMMUNICATION CO., LTD., Dongguan (CN)

(72) Inventor: Chengwei Yao, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 172 days.

(21) Appl. No.: 18/098,682

(22) Filed: Jan. 18, 2023

(65) Prior Publication Data
US 2023/0176633 A1    Jun. 8, 2023

Related U.S. Application Data

(63) Continuation of application No. PCT/CN2021/108622, filed on Jul. 27, 2021.

(30) Foreign Application Priority Data

Jul. 28, 2020 (CN) .......................... 202010737350.1

(51) Int. Cl.
| | |
|---|---|
| G06F 1/16 | (2006.01) |
| G06F 1/20 | (2006.01) |
| H01Q 1/24 | (2006.01) |
| H04R 9/02 | (2006.01) |

(52) U.S. Cl.
CPC .......... G06F 1/1635 (2013.01); G06F 1/1684 (2013.01); G06F 1/203 (2013.01); H01Q 1/243 (2013.01); H04R 9/022 (2013.01)

(58) Field of Classification Search
None
See application file for complete search history.

(56) References Cited

U.S. PATENT DOCUMENTS

| | | | |
|---|---|---|---|
| 5,703,399 A | 12/1997 | Majumdar et al. | |
| 10,171,125 B2 * | 1/2019 | Mow | H01Q 1/48 |
| 10,455,738 B2 * | 10/2019 | Pakula | H01M 50/247 |
| 11,228,091 B2 * | 1/2022 | Cha | H01Q 5/342 |

(Continued)

FOREIGN PATENT DOCUMENTS

| | | |
|---|---|---|
| CN | 1691088 A | 11/2005 |
| CN | 102882995 A | 1/2013 |

(Continued)

OTHER PUBLICATIONS

Extended European Search Report issued in related European Application No. 21850529.5, mailed Jan. 3, 2024, 9 pages.

(Continued)

*Primary Examiner* — Courtney L Smith
(74) *Attorney, Agent, or Firm* — IPX PLLC

(57) ABSTRACT

An electronic device is provided. The electronic device includes a housing, a battery, an antenna, a speaker module, and a heat sink. The battery, the antenna, the speaker module, and the heat sink are all disposed in a cavity formed by the housing. The battery and the speaker module are disposed adjacent to each other. A gap exists between the battery and the speaker module. The antenna is disposed on a periphery of a region where the battery and the speaker module are located. The heat sink is disposed on the speaker module and the battery, and an opening is disposed on the heat sink, where the opening is opposite to the gap.

10 Claims, 3 Drawing Sheets

(56) References Cited

U.S. PATENT DOCUMENTS

| | | |
|---|---|---|
| 2003/0050094 A1 | 3/2003 | Boyle et al. |
| 2016/0211570 A1 | 7/2016 | Jin et al. |
| 2016/0254588 A1* | 9/2016 | Kim .................. H01Q 1/24 |
| | | 343/702 |
| 2017/0170562 A1* | 6/2017 | Lee .................... H01Q 7/00 |
| 2020/0169816 A1 | 5/2020 | Kim et al. |
| 2021/0168226 A1* | 6/2021 | Keen ................ H04M 1/0264 |

FOREIGN PATENT DOCUMENTS

| | | |
|---|---|---|
| CN | 103221896 A | 7/2013 |
| CN | 104601759 A | 5/2015 |
| CN | 104956480 A | 9/2015 |
| CN | 105430124 A | 3/2016 |
| CN | 205584479 U | 9/2016 |
| CN | 106100662 A | 11/2016 |
| CN | 106129595 A | 11/2016 |
| CN | 207234896 U | 4/2018 |
| CN | 109286076 A | 1/2019 |
| CN | 109309508 A | 2/2019 |
| CN | 109765069 A | 5/2019 |
| CN | 109769341 A | 5/2019 |
| CN | 110389640 A | 10/2019 |
| CN | 209659611 U | 11/2019 |
| CN | 111278258 A | 6/2020 |
| CN | 111316620 A | 6/2020 |
| CN | 210723371 U | 6/2020 |
| CN | 111405829 A | 7/2020 |
| CN | 111901733 A | 11/2020 |
| EP | 3227956 B1 | 1/2019 |
| EP | 3598574 A1 | 1/2020 |
| KR | 20170010179 A | 1/2017 |
| WO | 2019156487 A1 | 8/2019 |

OTHER PUBLICATIONS

International Search Report issued in corresponding International Application No. PCT/CN2021/108622, mailed Oct. 22, 2021, 7 pages.

First Office Action issued in related Chinese Application No. 202010737350.1, mailed Apr. 6, 2021, 7 pages.

Sun Lichun et al., A New Broadband Metal Cavity Antenna, Radar Science and Technology, Oct. 17, 2017.

* cited by examiner

ELECTRONIC DEVICE

CROSS-REFERENCE TO RELATED APPLICATIONS

This application is a continuation of International Application No. PCT/CN2021/108622, filed Jul. 27, 2021, which claims priority to Chinese Patent Application No. 202010737350.1, filed Jul. 28, 2020. The entire contents of each of the above-referenced applications are expressly incorporated herein by reference.

TECHNICAL FIELD

This application pertains to the field of communications technologies, and in particular, to an electronic device.

BACKGROUND

With the development of smart terminals, sound playing by an audio speaker of a smart terminal is applied to more scenarios. The power for the speaker to work is converted into heat. In an increasing number of application scenarios, heat is concentrated at the speaker, resulting in the speaker being hot.

In the related art, to resolve the problem of heat generation by the speaker, a conventional solution is to dispose a heat sink on a magnetic isolation sheet (a part of a speaker's structure), a BOX profile steel sheet, and a battery of the speaker, to conduct the heat generated by the speaker to the battery, so as to achieve heat dissipation of a speaker module. However, due to the conductivity of a common heat sink, the common heat sink will form parasitic capacitance with a conductive layer inside an electronic device, and the parasitic capacitance will generate resonance with an antenna around the speaker, which will affect the transceiving performance of the antenna around the speaker.

SUMMARY

Embodiments of this application are intended to provide an electronic device.

According to a first aspect, an embodiment of this application provides an electronic device, including a housing, a battery, an antenna, a speaker module, and a heat sink, where the battery, the antenna, the speaker module, and the heat sink are all disposed in a cavity formed by the housing; the battery and the speaker module are disposed adjacent to each other, and a gap exists between the battery and the speaker module; and the heat sink is disposed on the speaker module and the battery, and an opening is disposed on the heat sink, where the opening is opposite to the gap.

In the embodiments of this application, the battery, the antenna, the speaker module, and the heat sink are all disposed in the cavity formed by the housing, where the battery and the speaker module are disposed adjacent to each other, and the antenna is disposed on a periphery of a region where the battery and the speaker module are located. By disposing the heat sink on the speaker module and the battery, heat generated by the speaker module can be conducted to the battery side, thus facilitating heat dissipation. Further, by disposing an opening on the heat sink at a position just opposite to a gap between the battery and the speaker module, parasitic resonance formed by the heat sink can be removed from an operating frequency band of the antenna. Therefore, interference with transceiving performance of the antenna can be reduced while an audio playing effect of the speaker module can be ensured.

REFERENCE NUMERALS IN THE ACCOMPANYING DRAWINGS

1—Housing; 2—Battery; 3—Heat sink; 301—First opening; 302—Second opening; 4—Magnetic isolation sheet; 5—Steel sheet; 6—Antenna.

DETAILED DESCRIPTION

The following clearly describes the technical solutions in the embodiments of this application with reference to the accompanying drawings. Apparently, the described embodiments are some but not all of the embodiments of this application. All other embodiments obtained by a person of ordinary skill in the art based on the embodiments of this application without creative efforts shall fall within the protection scope of this application.

The terms "first", "second", and the like in the specification and claims of this application are used to distinguish between similar objects instead of describing a specific order or sequence. It should be understood that the data used in this way is interchangeable in appropriate circumstances so that the embodiments of this application can be implemented in other orders than the order illustrated or described herein. In addition, in the specification and the claims, "and/or" represents at least one of connected objects, and a character "/" generally represents an "or" relationship between associated objects.

To resolve the foregoing problem, in this application, in consideration of an antenna standard, the influence of a heat sink on an antenna, a difference in structural design, and the like, a heat sink may be stuck in the design of a front end structure. Therefore, due to the conductivity of the heat sink, the heat sink will form parasitic capacitance with a conductive layer inside an electronic device, and the parasitic capacitance will generate resonance with an antenna around the speaker, which will affect transceiving performance of the antenna around the speaker.

With reference to the accompanying drawings, an electronic device provided in the embodiments of this application will be described in detail by using specific examples and application scenarios thereof.

Figure 1:
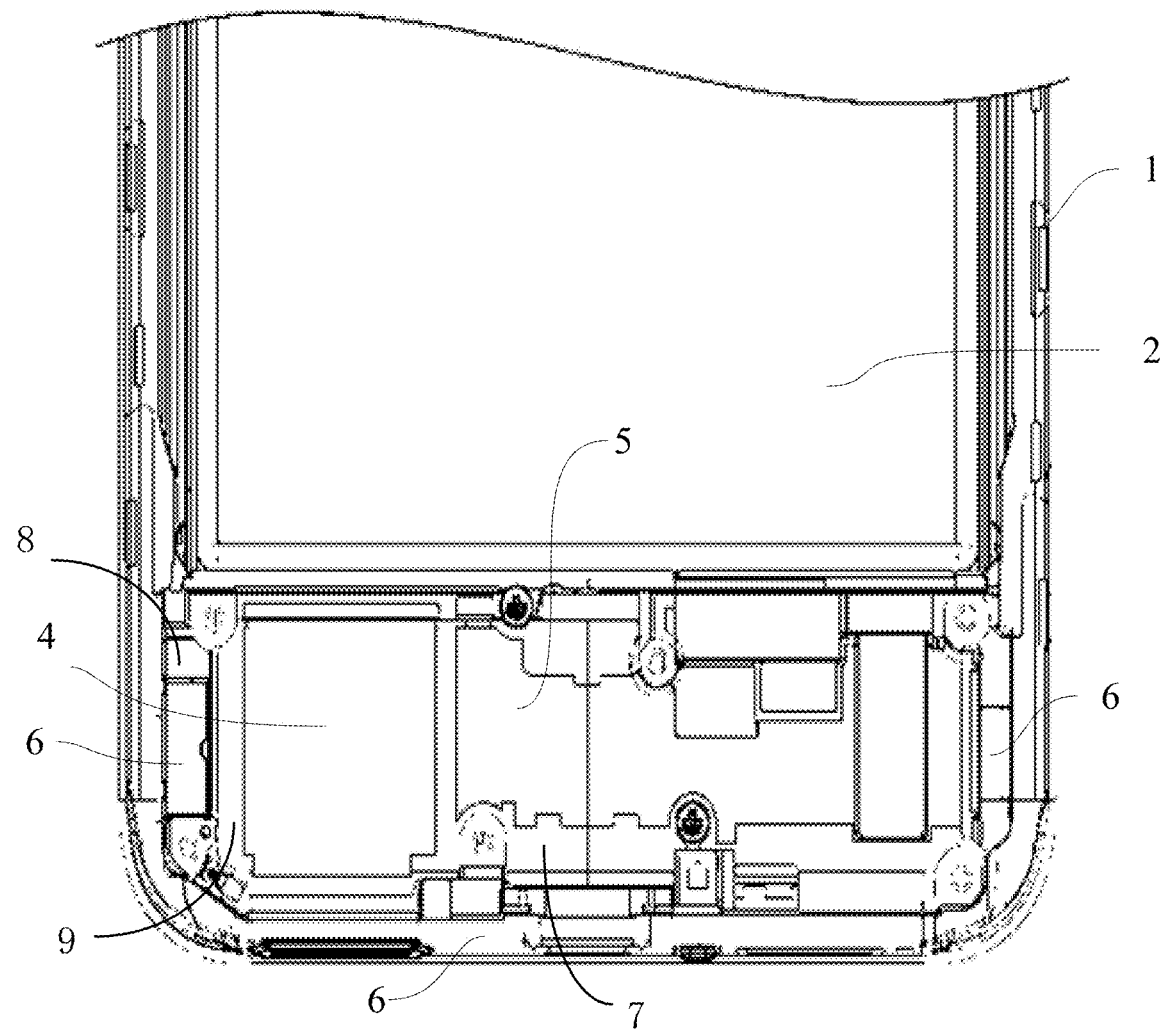
FIG. 1 is a first schematic structural diagram of an electronic device according to an embodiment of the present disclosure.
Figure 2:
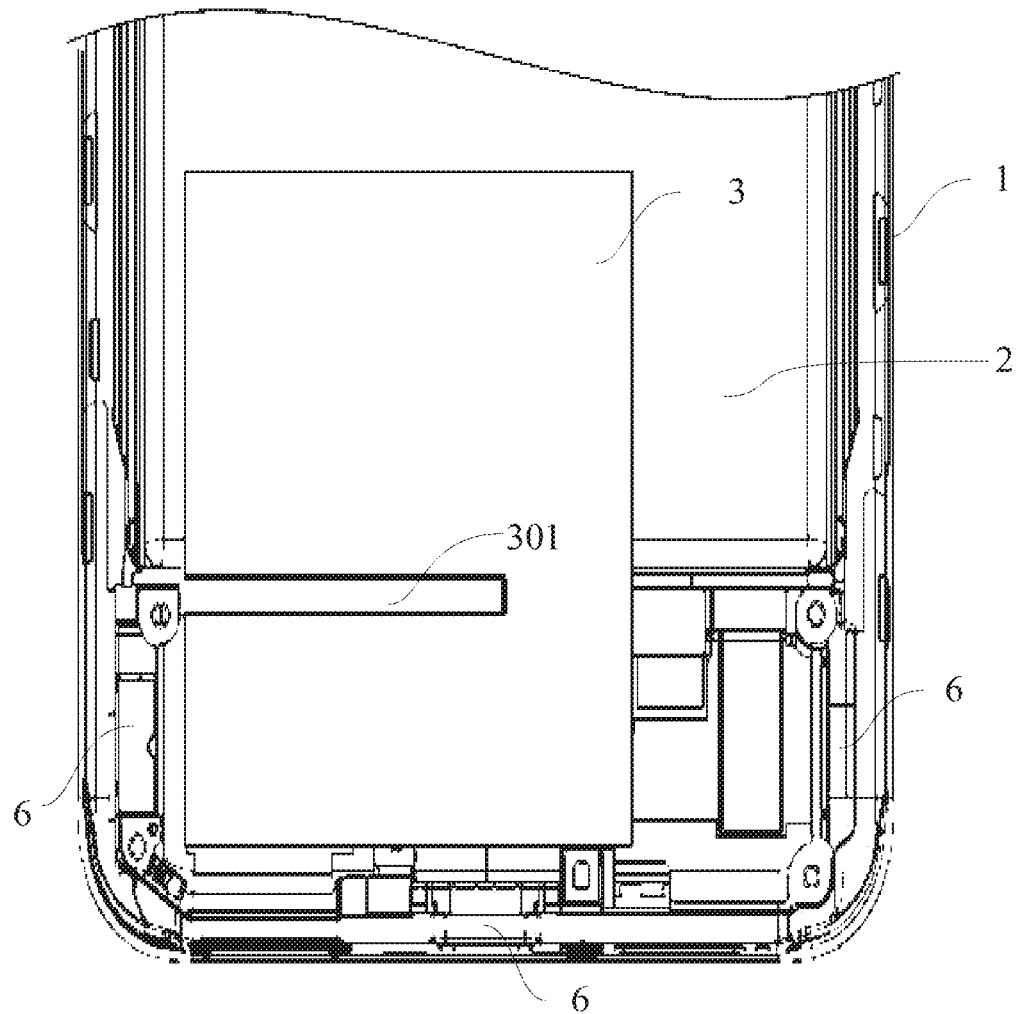
FIG. 2 is a second schematic structural diagram of the electronic device according to an embodiment of the present disclosure.
Figure 3:
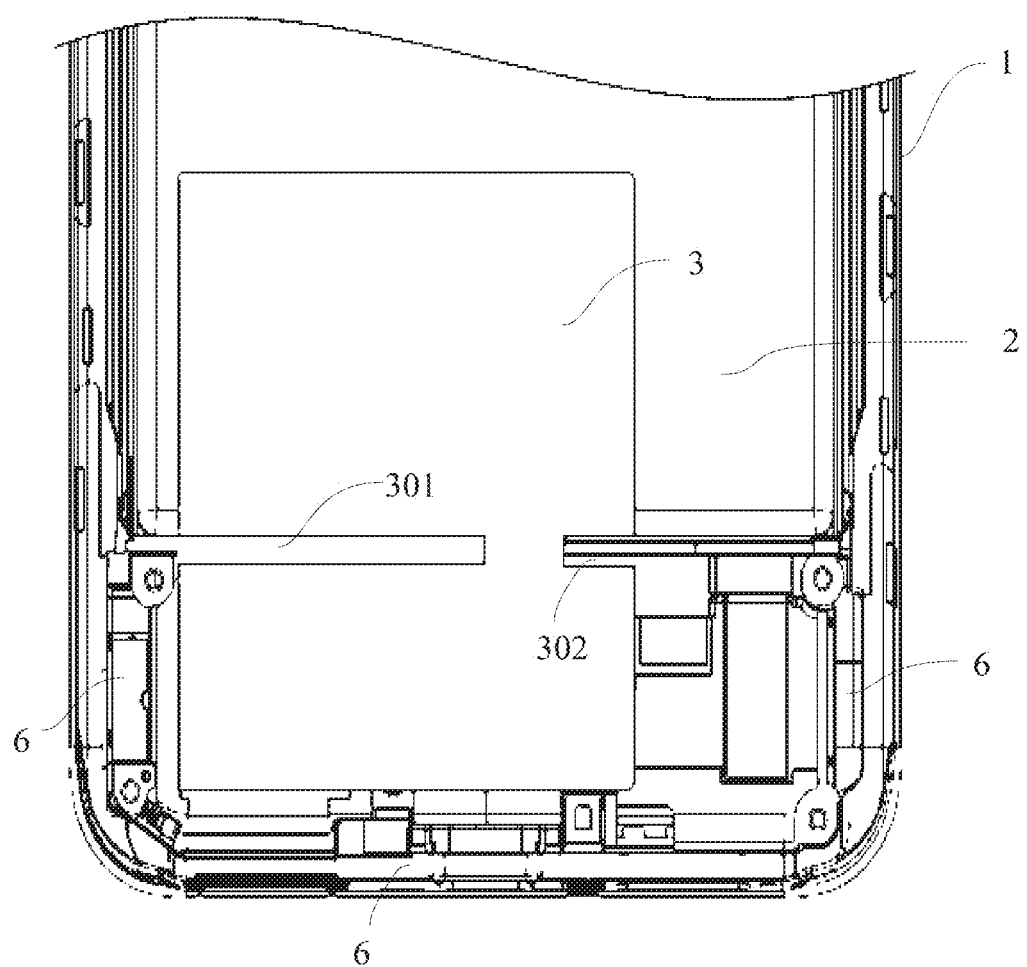
FIG. 3 is a third schematic structural diagram of the electronic device according to an embodiment of the present disclosure.

Referring to FIG. 1 to FIG. 3, this application provides an electronic device, including a housing 1, a battery 2, an antenna 6, a speaker module 7, and a heat sink 3, where the battery 2, the antenna 6, the speaker module 7, and the heat sink 3 are all disposed in a cavity formed by the housing 1, the battery 2 and the speaker module 7 are disposed adjacent to each other, a gap exists between the battery 2 and the speaker module 7, and the antenna 6 is disposed on a periphery of a region where the battery and the speaker module 7 are located; and the heat sink 3 is disposed on the speaker module 7 and the battery 2, where the heat sink 3 is provided with an opening, and the opening is opposite to the gap.

A material with good thermal conductivity is selected for the heat sink 3. Commonly used thermally conductive materials, such as thermally conductive glue, thermally conductive silicone grease, and a thermally conductive silica gel sheet, feature advantages of good thermal conductivity, flexibility, and the like. It can be ensured that a thermally conductive material can fully fill a gap of a contact surface under the condition of a relatively low installation pressure, to reduce thermal resistance between the heat sink 3 and the contact surface, thereby improving heat dissipation efficiency. In some embodiments, the heat sink is a graphene heat sink. The graphene heat sink has excellent heat conduction capability, which can not only conduct heat well in a direction in which the speaker module 7 is opposite to the battery 2, but also conduct heat in a longitudinal direction perpendicular to a plane. Therefore, the graphene heat sink facilitates heat conduction. In addition, the graphene heat sink itself features excellent flexibility, which can be stuck to a functional device well, so as to meet heat dissipation and installation requirements.

It should be noted that a metal (such as magnesium alloy, aluminum alloy, or n alloy) plate is disposed under a display screen of the electronic device. After the graphene heat sink is stuck to the speaker module 7 and the battery 2, there is a certain height difference between the graphene heat sink and the metal plate, so that the graphene heat sink and the metal plate are similar to two polar plates, and the metal plate is equivalent to a reference ground plane. This way, the high-frequency parasitic capacitance will be formed between the graphene heat sink with conductivity and the reference ground plane, and a parasitic antenna will be derived. In addition, as the height difference between the graphene heat sink and the reference ground plane is larger, the formed parasitic capacitance will be greater, and the derived parasitic antenna will generate a resonance frequency, which will have an unacceptable impact on antenna performance.

In this embodiment, a large area of the heat sink 3 is stuck to the speaker module 7 and the battery 2, to conduct heat generated by the speaker module 7 to the battery through the heat sink 3, so that heat dissipation of the speaker module 7 can be implemented. Further, by disposing an opening on the heat sink 3 at a position is opposite to a gap between the battery 2 and the speaker module 7, the formed parasitic resonance may be removed from an operating frequency band of the antenna, so that the influence of the parasitic capacitance formed by the heat sink 3 on the antenna can be reduced. Therefore, transceiving performance of the antenna is not affected while an audio playing effect of the speaker module can be ensured, thereby improving use experience of the user.

In an embodiment, the antenna 6 includes a high-frequency antenna, an intermediate-frequency antenna, and a low-frequency antenna. The high-frequency antenna and the intermediate-frequency antenna are disposed on a first side the speaker module 7, where the first side is a side far away from the battery 2, and the low-frequency antenna is disposed on a second side, and the second side is adjacent to the first side.

In some embodiments, the housing 1 includes a middle frame, and the first side is an inner side that is of the middle frame and that is close to the speaker module 7. For example, the high-frequency antenna and the intermediate-frequency antenna are disposed at an edge position that is in the inner side of the middle frame 1 and that is close to the speaker module 7. It can be understood that the parasitic antenna formed by the heat sink 3 in this environment will greatly influence the performance of the high-frequency antenna and the intermediate-frequency antenna on the first side. In this application, by disposing the opening on the heat sink 3 and enabling the opening to be opposite to the gap between the battery 2 and the speaker module 7, the parasitic resonance formed by the heat sink 3 can be removed from operating frequency bands of the high-frequency antenna and the intermediate-frequency antenna, thereby reducing the influence of the parasitic capacitance on the transceiving performance of the antenna.

In an embodiment, a size of the opening is related to a position for disposing the antenna 6.

It should be noted that a structure of the antenna 6 is designed and laid out according to an intermediate frequency and a high frequency, and a length and width of the opening on the heat sink 3 may be determined based on the position for disposing the antenna 6 and according to the influence of simulated coupling. A length direction of the opening corresponds to an extension direction of the gap between the battery and the speaker module 7, and a width direction of the opening corresponds to a width direction of the gap. This way, based on the position for disposing the antenna 6, a proper opening size is set, which can minimize the influence of the parasitic capacitance on the performance of the antenna 6.

Referring to FIG. 1 and FIG. 2, in an embodiment, the speaker module 7 includes a steel sheet 5 and a magnetic isolation sheet 4, a gap formed between the magnetic isolation sheet 4 and the battery 2 is a first gap, and a first opening 301 on the heat sink is disposed opposite to the first gap.

It should be noted that the magnetic isolation sheet 4 is a kind of magnetic sheet with great magnetic permeability, which is soft in texture and covered with adhesive glue on one side. Such magnetic sheet can be made into different thicknesses according to different applications, and can be die-cut into a required size and shape. The magnetic insulation sheet absorbs electromagnetic wave energy and converts the electromagnetic wave energy into heat energy by using electronic scattering caused by thermal motion of a functional component in a lattice electric field and interaction between electrons, so as to achieve a purpose of attenuating the electromagnetic wave. Further, in consideration of a design thickness of a whole device structure, the steel sheet 5 is a BOX profile steel sheet, a thickness of the BOX profile steel sheet is 0.2 mm, and a thickness of a plastic cement BOX is 0.5 mm. On the premise of ensuring the thickness of the whole device, the use of the BOX profile steel sheet can reduce the thickness of the whole device by 0.3 mm, so as to design a horn cavity structure, so that a volume of a sound cavity 8 can be increased, and a good sound playing effect of the speaker of the whole device can be achieved.

In this embodiment, the heat sink 3 has a structure disposed with an opening on a single side, that is, the opening is disposed that is on the heat sink 3 and that is only at a gap between the magnetic isolation sheet 4 and the battery 2, but no opening is disposed at a gap between the steel sheet 5 and the battery 2. Because a graphite heat sink and a metal plate under a display screen form two plates of capacitance, as a height difference between the graphite heat sink and the metal plate is larger, formed parasitic capacitance will be greater, and then interference with transceiving performance of an antenna 6 will be greater. On a terminal product, a distance between a region between the magnetic isolation sheet and the battery and the metal plate under the display screen is the largest, which has the greatest interference with the antenna 6. Therefore, an opening disposed at the gap between the magnetic isolation sheet 4 and the battery 2 can effectively reduce the generation of the parasitic capacitance, and then the transceiving performance of the antenna 6 can be improved.

It should be noted that, compared with a method for sticking the heat sink 3 disposed without an opening, structural design of sticking the heat sink 3 disposed with an opening can not only ensure heat dissipation performance, but also reduce the influence on the performance of the antenna 6. That is, the heat sink disposed with the first opening 301 and a heat sink disposed without the first opening 301 have almost same heat dissipation performance for the speaker module 7. However, because a position of the opening will not form capacitance with the metal plate under the display screen, an influence of the heat sink disposed with the first opening 301 on the antenna 6 disposed on a periphery of a middle frame can be greatly reduced compared with the heat sink disposed without the first opening 301. Therefore, in this embodiment, the influence of parasitic capacitance on the performance of the antenna 6 can be reduced without affecting the heat dissipation performance of the speaker module 7.

Further, as shown in FIG. 3, a gap formed between the steel sheet 5 and the battery 2 is a second gap, and a second opening 302 on the heat sink 3 is disposed at a position opposite to the second gap.

In this embodiment, the heat sink 3 has a structure disposed with two openings on two sides, that is, a first opening is disposed for the heat sink 3 at a gap between a magnetic isolation sheet 4 and the battery 2, and a second opening is disposed at a gap between the steel sheet 5 and the battery 2. Heat generated by a speaker module is conducted to a battery side through a connecting part that is of the heat sink 3 and that is between the first opening 301 and the second opening 302. The structure disposed with the two openings on two sides of the heat sink 3 is disposed to eliminate an influence of parasitic capacitance on an antenna 6, which cannot be eliminated by a structure disposed with one opening on one side.

It should be noted that the magnetic isolation sheet 4 is suspended above a sound cavity 8 of the speaker module 7 as shown in FIG. 1. The electronic device includes a display screen, and a metal plate is disposed under the display screen. The steel sheet 5 and the metal plate are connected by a single bolt, so that the steel sheet 5 can be connected by single-point grounding. In some embodiments, the steel sheet 5 is connected to the metal plate through multiple bolts, so that the steel sheet 5 can be connected by even grounding. In some embodiments, the steel sheet 5 is suspended on a side that is of the speaker module and that is away from the metal plate, so that the steel sheet 5 can be connected by no grounding.

In an embodiment, to reduce a coupling path of a parasitic antenna, an insulation layer 9 is disposed between the magnetic isolation sheet 4 and the heat sink 3 as shown in FIG. 1 and FIG. 2. However, the insulation layer 9 has little influence on the temperature rise of the speaker module 7, so as to further reduce the influence of the parasitic capacitance formed by the heat sink 3 on the performance of the antenna 6.

In some embodiments, the insulation layer 9 is a thermal insulating layer. For example, the insulation layer may be a PET insulation layer. The PET, commonly known as polyester resin, belongs to crystalline saturated polyesters, and is a milky white or light yellow, and highly crystallographic polymer with a smooth and shiny surface, and is characterized with creep resistance, fatigue resistance, abrasion resistance, good dimensional stability, little wear, and high hardness.

Further, a thickness of the insulation layer is not less than 0.1 mm. This way, if space allows, the coupling path of the parasitic antenna may be better reduced, thus reducing the influence of the parasitic capacitance on the performance of antenna 6.

In an embodiment, the housing 1 is provided with a heat dissipation interlayer on a side close to the speaker module. For example, a side that is of the housing 1 and that is close to the speaker module is disposed as a heat dissipation interlayer structure, such as that a slice layer made of graphene or copper with good thermal conductivity is disposed at a position that is on the housing 1 and that is opposite to the speaker module. This way, heat generated by the speaker module may be directly dissipated through the housing 1, so that a heat dissipation path can be increased, and then heat dissipation performance of the speaker module can be better improved, and strength and toughness of the housing 1 can be enhanced.

It should be noted that in this specification, relationship terms such as "first" and "second" are merely used to distinguish one entity or operation from another, and do not necessarily require or imply that any actual relationship or sequence exists between these entities or operations. In addition, the terms "comprise", "include" and any other variants thereof are intended to cover non-exclusive inclusion, so that a process, a method, an article, or an apparatus that includes a series of elements not only includes these elements, but may also include other elements not expressly listed, or also include elements inherent to this process, method, article, or apparatus. An element limited by "includes a . . . " does not, without more constraints, does not include the presence of additional identical elements in the process, method, article, or apparatus that includes the element.

The embodiments of this application are described above with reference to the accompanying drawings, but this application is not limited to the foregoing specific implementations. The foregoing specific implementations are merely schematic instead of restrictive. Under the enlightenment of this application, a person of ordinary skills in the art may make many forms without departing from aims and the protection scope of claims of this application, all of which fall within the protection scope of this application.

What is claimed is:

1. An electronic device, comprising a housing, a battery, an antenna, a speaker module, and a heat sink, wherein:
   the battery, the antenna, the speaker module, and the heat sink are all disposed in a cavity formed by the housing;
   the battery and the speaker module are disposed adjacent to each other, a battery-speaker gap exists between the battery and the speaker module;
   the antenna is disposed on a periphery of a region where the battery and the speaker module are located; and
   the heat sink is disposed on the speaker module and the battery, wherein the heat sink includes a heat-sink opening, and the heat-sink opening is opposite to the battery-speaker gap.

2. The electronic device according to claim 1, wherein the speaker module comprises a steel sheet and a magnetic isolation sheet, a first gap is formed between the magnetic isolation sheet and the battery, and a first opening on the heat sink is disposed at a position opposite to the first gap.

3. The electronic device according to claim 2, wherein a second gap is formed between the steel sheet and the battery, and a second opening on the heat sink is disposed at a position opposite to the second gap.

4. The electronic device according to claim 2, wherein an insulation layer is disposed between the magnetic isolation sheet and the heat sink.

5. The electronic device according to claim 4, wherein the insulation layer is a thermal insulating layer.

6. The electronic device according to claim 4, wherein a thickness of the insulation layer is not less than 0.1 mm.

7. The electronic device according to claim 1, wherein the heat sink is a graphite heat sink.

8. The electronic device according to claim 2, wherein the magnetic isolation sheet is suspended above a sound cavity of the speaker module.

9. The electronic device according to claim 1, wherein a size of the heat-sink opening is configured according to a position for disposing the antenna.

10. The electronic device according to claim 9, wherein the antenna comprises a high-frequency antenna, an intermediate-frequency antenna, and a low-frequency antenna, wherein:
the high-frequency antenna and the intermediate-frequency antenna are disposed on a first side of the speaker module, wherein the first side is a side far away from the battery; and
the low-frequency antenna is disposed on a second side, wherein the second side is adjacent to the first side.

* * * * *